United States Patent
Wang

(10) Patent No.: US 10,798,356 B2
(45) Date of Patent: Oct. 6, 2020

(54) WHITE BALANCE PROCESSING METHOD, ELECTRONIC DEVICE AND COMPUTER READABLE STORAGE MEDIUM

(71) Applicant: GUANGDONG OPPO MOBILE TELECOMMUNICATIONS CORP., LTD., Dongguan, Guangdong (CN)

(72) Inventor: Huichao Wang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 200 days.

(21) Appl. No.: 16/054,521

(22) Filed: Aug. 3, 2018

(65) Prior Publication Data
US 2019/0132566 A1    May 2, 2019

(30) Foreign Application Priority Data
Oct. 30, 2017    (CN) .......................... 2017 1 1037476

(51) Int. Cl.
  *H04N 9/73*   (2006.01)
  *H04N 1/60*   (2006.01)
(52) U.S. Cl.
  CPC .......... *H04N 9/735* (2013.01); *H04N 1/6027* (2013.01); *H04N 1/6086* (2013.01)
(58) Field of Classification Search
  CPC ..... H04N 9/735; H04N 1/6086; H04N 1/6027
  See application file for complete search history.

(56) References Cited

U.S. PATENT DOCUMENTS

| 2006/0176379 | A1 | 8/2006 | Hyodo |
| 2007/0091184 | A1 | 4/2007 | Wang |

(Continued)

FOREIGN PATENT DOCUMENTS

| CN | 101282489 A | 10/2008 |
| CN | 101577831 A | 11/2009 |

(Continued)

OTHER PUBLICATIONS

U.S. Appl. No. 16/571,838, Notice of Allowance dated Nov. 19, 2019, 10 pages.

(Continued)

*Primary Examiner* — Ross Varndell
(74) *Attorney, Agent, or Firm* — Lathrop GPM LLP

(57) ABSTRACT

The present disclosure provides a white balance processing method. The white balance processing method includes the following. Each image of the plurality of successive frame images is processed to determine color temperature corresponding to a main light source. It is determined whether a variation of primary color temperature is greater than or equal to a predetermined threshold. The variation of primary color temperature refers to a difference between the color temperature of the main light source in a second frame image subjected to the color temperature variation and the color temperature of the main light source in a first frame image subjected to the color temperature variation. The white balance process is performed on the second frame image subjected to the color temperature variation according to the color temperature of the main light source in the first frame image subjected to the color temperature variation when the variation of primary color temperature is less than the predetermined threshold.

16 Claims, 12 Drawing Sheets

(56) References Cited

U.S. PATENT DOCUMENTS

| | | |
|---|---|---|
| 2008/0080764 A1 | 4/2008 | Kim et al. |
| 2008/0278601 A1 * | 11/2008 | Goel .................. H04N 9/735 348/223.1 |
| 2015/0116534 A1 | 4/2015 | Kim |
| 2019/0132566 A1 | 5/2019 | Wang |
| 2019/0158796 A1 | 5/2019 | Wang |

FOREIGN PATENT DOCUMENTS

| | | |
|---|---|---|
| CN | 102104709 A | 6/2011 |
| CN | 102892010 A | 1/2013 |
| CN | 103037224 A | 4/2013 |
| CN | 103200410 A | 7/2013 |
| CN | 106162135 A | 11/2016 |
| CN | 107801013 A | 3/2018 |
| JP | 2007013415 A | 1/2007 |
| JP | 2015204532 * | 4/2014 |
| JP | 2015204532 A | 11/2015 |
| KR | 20060104495 A | 10/2006 |
| WO | WO 2016047894 A1 | 3/2016 |

OTHER PUBLICATIONS

PCT/CN2018/103828 English Translation of the International Search Report and Written Opinion dated Nov. 21, 2018, 9 pp.
Chinese Patent Application No. 201711037476.2, English translation of Office Action dated Jan. 22, 2019, 5 pages.
Chinese Patent Application No. 201711037476.2, Office Action dated Jan. 22, 2019, 6 pages.
European Patent Application No. 18190938.3, extended Search and Opinion dated Mar. 7, 2019, 11 pages.
Indian Patent Application No. 201834031648 First Office Action dated May 20, 2020, 8 pages.

* cited by examiner

WHITE BALANCE PROCESSING METHOD, ELECTRONIC DEVICE AND COMPUTER READABLE STORAGE MEDIUM

CROSS REFERENCE TO RELATED APPLICATION

This application claims priorities to Chinese Patent Application No. 201711037476.2, filed with the State Intellectual Property Office of P.R. China on Oct. 30, 2017, by GUANGDONG OPPO MOBILE TELECOMMUNICATIONS CORP. and titled with "White Balance Processing Method And Device, Electronic Device And Computer Readable Storage Medium".

TECHNICAL FIELD

The present disclosure relates to the field of the image processing technology, and more particular to a white balance processing method and device, an electronic device and a computer readable storage medium.

BACKGROUND

In a scenario with multiple light sources, a white balance processing method in related arts may detect the light sources by processing an image and select one of the light sources as a main light source. Therefore, a white balance processing is performed based on color of the main light source.

SUMMARY

A white balance processing method according to implementations of the present disclosure is used to perform a white balance processing on a plurality of successive frame images under a scenario with multiple light sources. The white balance processing method includes: processing each frame image of the plurality of successive frame images to determine color temperature corresponding to a main light source; determining whether a variation of primary color temperature is greater than or equal to a predetermined threshold, the variation of primary color temperature referring to a difference between the color temperature of the main light source in a second frame image subjected to a color temperature variation and the color temperature of the main light source in a first frame image subjected to the color temperature variation; and performing the white balance process on the second frame image subjected to the color temperature variation according to the color temperature of the main light source in the first frame image subjected to the color temperature variation when the variation of primary color temperature is less than the predetermined threshold.

An electronic device according to implementations of the present disclosure includes one or more processors, a memory and one or more programs. The one or more programs are stored in the memory and are configured to be executable by the one or more processors. The one or more programs include instructions for executing the white balance processing method.

A computer readable storage medium according to implementations of the present disclosure includes computer programs cooperating with an electronic device. The computer programs are executed by a processor to execute the white balance processing method.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
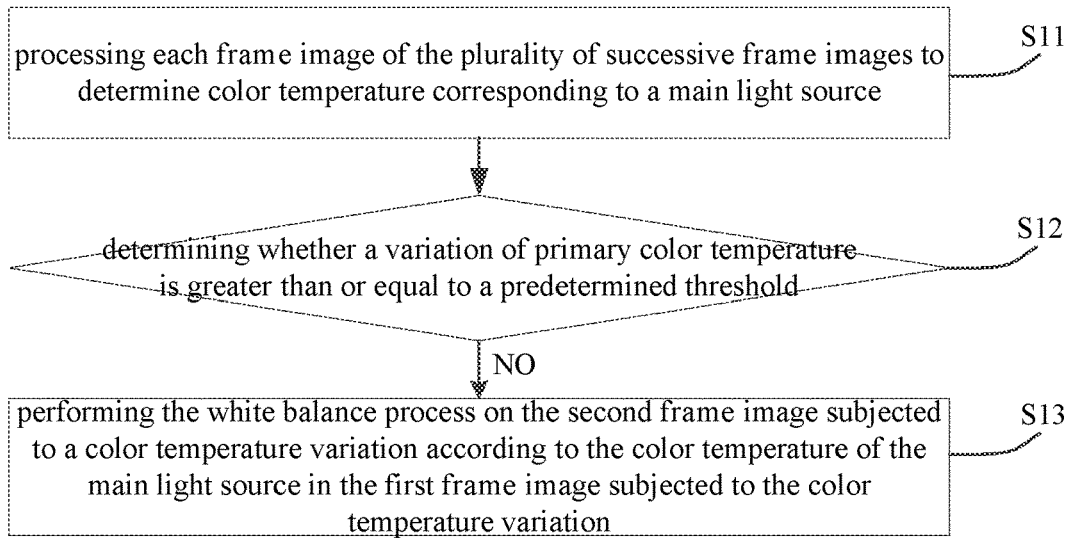
FIG. 1 is a flow chart illustrating a white balance processing method according to an implementation of the present disclosure.

Descriptions will be made in detail to implementations of the present disclosure and examples of the implementations are illustrated in drawings. The same or similar elements and the elements having same or similar functions are denoted by like reference numerals throughout the descriptions. The implementations described herein with reference to drawings are explanatory, are used to understand the implementations of the present disclosure, and are not be construed to limit the implementations of the present disclosure.

In the descriptions of implementations of the present disclosure, it is to be understood that, orientations and positional relations indicated by terms such as "central", "longitudinal", "lateral", "length", "width", "thickness", "above", "below" "front", "rear", "right", "left", "vertical", "horizontal", "top", "bottom", "inner", "outer", "clockwise", "anti-clockwise" are based on the orientations and positional relations as shown in the drawings, only used to describe the implementations of the present disclosure and to simplify descriptions, and do not indicate or imply that the device or element referred to must have a particular orientation, be constructed or operated in a certain orientation. Therefore, these relative terms are not constructed to limit the implementations of the present disclosure. In addition, terms "first" and "second" are only used for purposes of description and are not intended to indicate or imply relative importance or the number of technical features. In addition, the feature defined with "first" and "second" may explicitly or implicitly comprise one or more this feature. In the description of the present disclosure, the term "a plurality of" means two or more than two, unless specified otherwise.

In the descriptions of the implementations of the present disclosure, it is to be noted that, unless explicitly specified or limited otherwise, the terms "mounted," "connected," and "coupled," are used broadly and encompass such as fixed, detachable or integral connections; also can be mechanical or electrical connections or can communicate with each other; also can be direct and indirect connections via an intermediate medium, and further can be internal connections or the interactions between two elements, unless otherwise expressly defined which can be understood by those skilled in the art according to the detail embodiment of the present disclosure.

In the implementations of the present disclosure, unless explicitly specified or limited otherwise, a structure in which a first feature is "on" or "beneath" a second feature may include an embodiment in which the first feature directly contacts the second feature, and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature is "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

Many different embodiments or examples are provided in the disclosure for implementing different structures according to implementations of the present disclosure. In order to simplify the disclosure of the implementations of the present invention, components and arrangements of the specific examples are described below. Certainly, they are merely examples and are not intended to limit the present disclosure. In addition, reference numerals and/or reference letters may be repeated in different examples in the implementations of the present disclosure, which are for the purpose of simplicity and clarity, and do not indicate the relationship among the various implementations and/or arrangements discussed. Moreover, the implementations of the present invention provide examples of various specific processes and materials, but the use of other processes and/or the use of other materials may be recognized by one of ordinary skill in the art.

In related arts, when a camera is shaken, a main light source may be switched among multiple light sources due to a shaking of a field of view. As a result, a tone of a preview image having white balance corrected is varied, causing poor usage experience.

Embodiments of the present disclosure provide a white balance processing method, used to perform a white balance processing on a plurality of successive frame images under a scenario with multiple light sources. The white balance processing method includes: processing each frame image of the plurality of successive frame images to determine color temperature corresponding to a main light source; determining whether a variation of primary color temperature is greater than or equal to a predetermined threshold, the variation of primary color temperature referring to a difference between the color temperature of the main light source in a second frame image subjected to a color temperature variation and the color temperature of the main light source in a first frame image subjected to the color temperature variation; and performing the white balance process on the second frame image subjected to the color temperature variation according to the color temperature of the main light source in the first frame image subjected to the color temperature variation when the variation of primary color temperature is less than the predetermined threshold.

Embodiments of the present disclosure provide a white balance processing device, configured to perform a white balance process on a plurality of successive frame image under a scenario with multiple light sources. The white balance processing device includes: a first processing module, configured to process each frame image of the plurality of successive frame images to determine color temperature corresponding to a main light source; a first judging module, configured to determine whether a variation of primary color temperature is greater than or equal to a predetermined threshold, the variation of primary color temperature referring to a difference between the color temperature of the main light source in a second frame image subjected to a color temperature variation and the color temperature of the main light source in a first frame image subjected to the color temperature variation; and a second processing module, configured to perform the white balance process on the second frame image subjected to the color temperature variation according to the color temperature of the main light source in the first frame image subjected to the color temperature variation when the variation of primary color temperature is less than the predetermined threshold.

Embodiments of the present disclosure provide an electronic device including one or more processors, a memory and one or more programs. The one or more programs are stored in the memory and are configured to be executable by the one or more processors. The one or more programs include instructions for executing the white balance processing method.

Embodiments of the present disclosure provide a computer readable storage medium according to implementations of the present disclosure includes computer programs cooperating with an electronic device. The computer programs are executed by a processor to execute the white balance processing method.

With the white balance processing method, the white balance processing device, the electronic device and the computer readable storage medium according to implementations of the present disclosure, when the variation of the primary color temperature of the main light source between two adjacent frame images is less than the predetermined threshold, the white balance process is performed on a present frame image according to the color temperature of the main light source in an adjacent previous frame image. Therefore, a frequent switch of the main light source caused by a shaking of the field of view may be prevented when the camera is shaken, and the variation of a tone of a preview image having white balance corrected is further prevented, thereby improving user experience.

Referring to FIG. 1, a white balance processing method according to an implementation of the present disclosure is used to perform a white balance process on a plurality of successive frame images under a scenario with multiple light sources. The white balance processing method includes the following.

In block S11, each frame image of the plurality of the successive frame images is processed to determine color temperature corresponding to a main light source.

In block S12, it is judged whether a variation of primary color temperature is greater than or equal to a predetermined threshold. The variation of the primary color temperature refers to a difference between the color temperature of the main light source in a second frame image subjected to a color temperature variation and the color temperature of the main light source in a first frame image subjected to the color temperature variation.

In block S13, when the variation of the primary color temperature is less than the predetermined threshold, a white balance process is performed on the second frame image subjected to the color temperature variation according to the color temperature of the main light source in the first frame image subjected to the color temperature variation. With the white balance processing method according implementations of the present disclosure, when the variation of the primary color temperature of the main light source in two adjacent frame images is less than the predetermined threshold, the white balance process is performed on a present frame image using the color temperature of the main light source in an adjacent previous frame image. Therefore, a frequent switch of the main light source caused by a shaking of the field of view may be prevented when the camera is shaken, and the variation of a tone of a preview image having white balance corrected is further prevented, thereby improving user experience.

Figure 2:
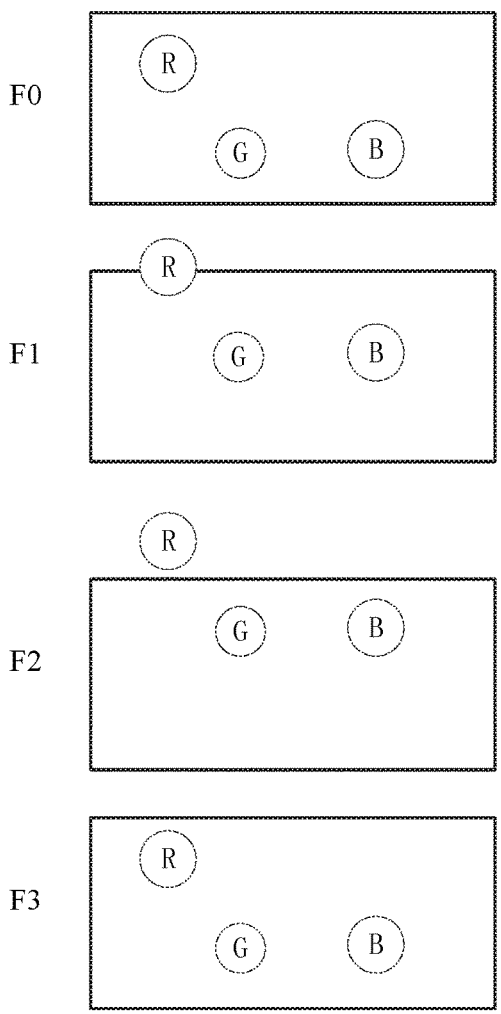
FIG. 2 is a schematic diagram illustrating a scenario of a white balance processing method according to an implementation of the present disclosure.

Specifically, referring to FIG. 2, in an embodiment, when the camera is shaken (such as shaken up and down), a plurality of frame images are presented in the field of view of the camera in turn, including F0, F1, F2, F3 . . . . It is assumed that F0 is a first frame image subjected to the color temperature variation, F1 is a second frame image subjected to the color temperature variation, F2 is a third frame image subjected to the color temperature variation, and F3 is a fourth frame image subjected to the color temperature variation. In the image F0, the light source R is the main light source, and the color temperature of the light source R is CCT0. The white balance process is performed on the image F0 according to the color temperature CCT0 of the light source R with the white balance processing method. In the image F1, the light source R is partially moved out of the field of view, the light source B is the main light source, and the color temperature of the light source B is CCT1. It is judged whether an absolute value |CCT1−CCT0| of a difference between CCT1 and CCT0 (i.e. the variation $\Delta T$ of the primary color temperature) is greater than or equal to the predetermined threshold T0 (for example the predetermined threshold T0 may be 50K, 100K, 120K or the like, which is not limited herein). When $\Delta T<T0$, the white balance process is performed on the image F1 according to the color temperature CCT0 of the light source R. Therefore, a frequent switch of a selected main light source caused by a slight shaking of the camera may be prevented.

Figure 3:
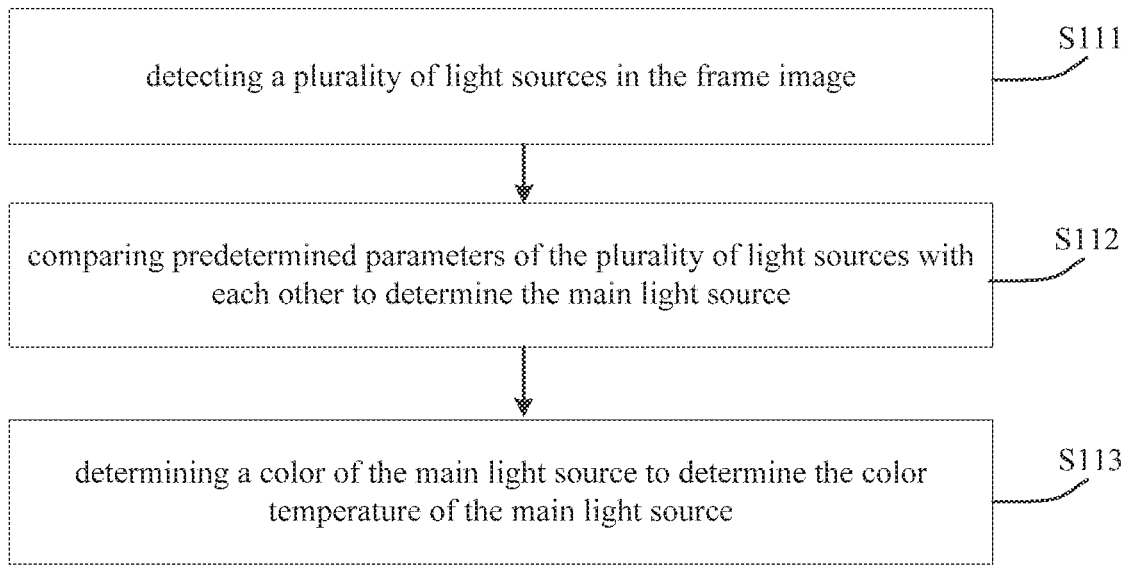
FIG. 3 is a flow chart illustrating a white balance processing method according to an implementation of the present disclosure.

Referring to FIG. 3, in some implementations, the block S11 includes the following.

In block S111, a plurality of light sources in the image are detected.

In block S112, predetermined parameters of the plurality of light sources are compared with each other to determine the main light source.

In block S113, a color of the main light source is determined to determine the color temperature of the main light source.

With the white balance processing method according to an implementation of the present disclosure, each frame image is detected to determine the plurality of light sources in the frame image. The predetermined parameters of the plurality of light sources are compared with each other to determine the main light source in the present frame image, such that the color temperature of the main light source in the present frame image is determined. In some implementations, the plurality of light sources are light sources having different color temperature.

Specifically, referring to FIG. 2 again, taking the image F0 as an example, the plurality of light sources R, G and B in the image F0 are detected with the white balance processing method. The predetermined parameters of the plurality of light sources R, G and B are compared with each other to determine which of the light sources R, G and B as the main light source. When the light source R is determined as the main light source, the color of the light source R is detected to determine the color temperature of the light source R. When the light source G is determined as the main light source, the color of the light source G is detected to determine the color temperature of the light source G When the light source B is determined as the main light source, the color of the light source B is detected to determine the color temperature of the light source B. In this example, the light source R is the main light source, and the color temperature of the light source R is detected to be CCT0. With a same way, corresponding color temperature of the main light source may be determined with the white balance processing method for the images F1, F2, F3 . . . .

Figure 4:
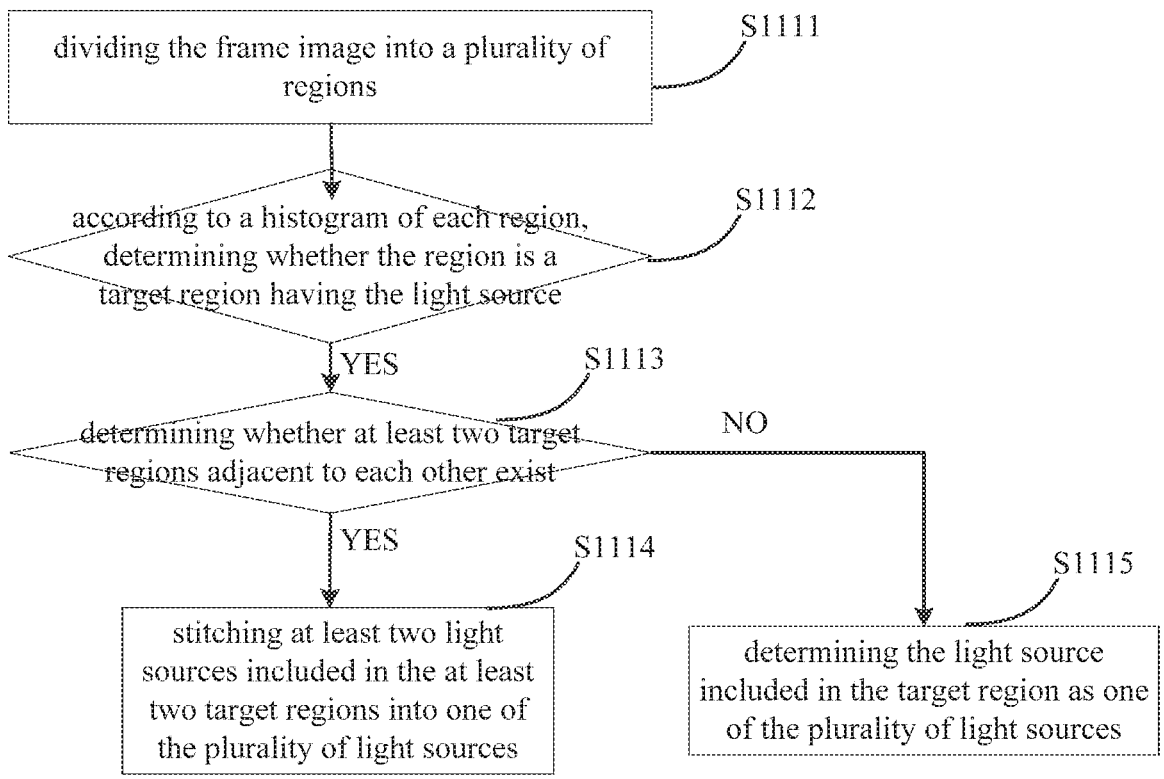
FIG. 4 is a flow chart illustrating a white balance processing method according to an implementation of the present disclosure.

Referring to FIG. 4, in some implementations, the block S111 includes the following.

In block S1111, the frame image is divided into a plurality of regions.

In block S1112, according to a histogram of each region, it is determined whether the region is a target region having the light source.

In block S1113, when the region is the target region having the light source, it is determined whether at least two target regions adjacent to each other exist.

In block S1114, when the at least two target regions exist, at least two light sources included in the at least two target regions are stitched into one of the plurality of light sources.

In block S1115, when the at least two target regions do not exist, the light source included in the target region is determined as one of the plurality of light sources.

Figure 5:
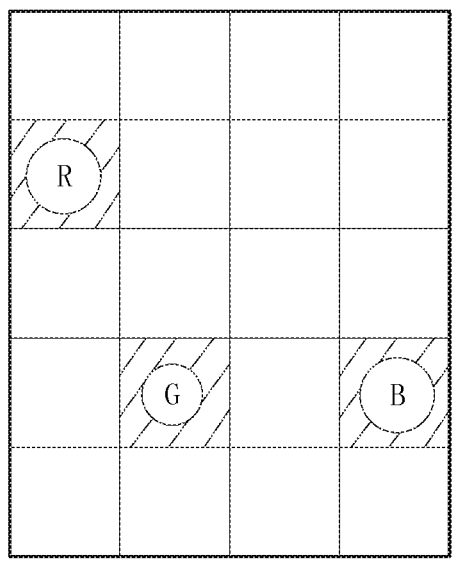
FIG. 5 is a schematic diagram illustrating a scenario of a white balance processing method according to an implementation of the present disclosure.
Figure 6:
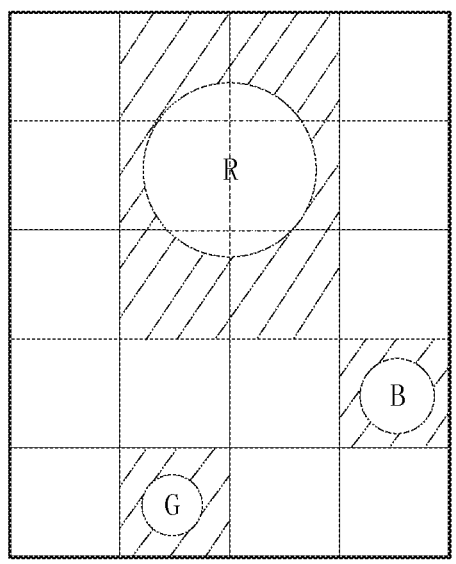
FIG. 6 is a schematic diagram illustrating a scenario of a white balance processing method according to an implementation of the present disclosure.
Figure 7:
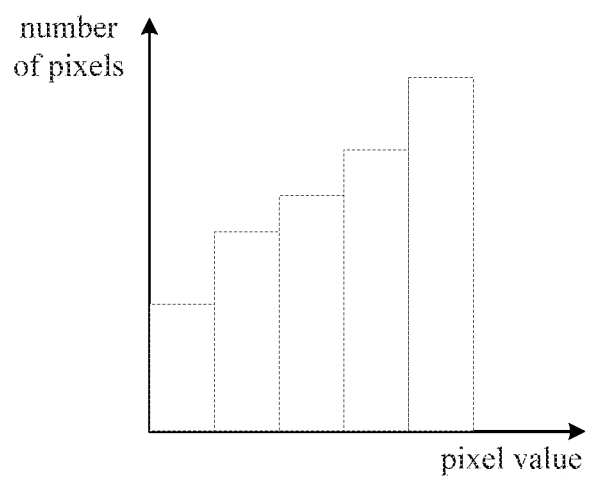
FIG. 7 is a histogram for each region described in a white balance processing method according to an implementation of the present disclosure.

Specifically, referring to FIGS. 5 to 7, in an embodiment, the frame image is divided into a plurality of regions with the white balance processing method, such as 4*5 regions. For each region, four histograms may be depicted according to channel values of channels R, Gr, Gb, B. It is judged whether the region is the target region having the light source according to the four histograms of each region. As illustrated in FIGS. 5 and 6, each frame image includes a plurality of target regions. For example, the image illustrated in FIG. 5 includes three target regions, while the image illustrated in FIG. 6 includes eight target regions. When the target region having the light source exist in the image, it is judged whether at least two target regions adjacent to each other exist with the white balance processing method. That is, it is judged whether a single light source is included in the at least two target regions. The term "included" refers to partially included or fully included. When the at least two target regions exist, at least two light sources included in the at least two target regions are stitched into one of the plurality of light sources with the white balance processing method. When the at least two target regions do not exist, each light source included in each target regions is determined as one of the plurality of light sources with the white balance processing method. Referring to FIG. 5, the light sources included in three target regions that are not adjacent to each other are each determined as the light source R, the light source G and the light source B. Referring to FIG. 6, the light sources included in six target regions that are adjacent to each other are stitched into a complete light source R, and the light sources included in two other regions that are not adjacent to each other are each determined as the light source G and the light source B.

In addition, it is to be noted that, the method for depicting the histogram for a region illustrated in FIG. 7 is merely exemplary. A horizontal axis of the histogram illustrated in FIG. 7 is the pixel value, while the longitudinal axis of the histogram is the number of pixels. In other embodiments, the horizontal axis of the histogram may also be the number of pixels, while the longitudinal axis of the histogram may be the pixel value. Alternatively, the horizontal axis of the histogram is the ratio of the number of pixels while the longitudinal axis of the histogram is the pixel value. Alternatively, the horizontal axis of the histogram is the pixel value, while the longitudinal axis of the histogram is the ratio of the number of pixels.

In some implementations, determining whether the region is the target region having the light source according to the histogram of the region may be realized by determining whether the number of pixels having a pixel value greater than a predetermined value exceeds a predetermined ratio. For example, it may be determined whether the ratio of the number of pixels having the pixel value greater than 239 exceeds 5%. When the ratio of the number of pixels having the pixel value greater than 239 exceeds 5%, it is indicated that the region is the target region having the light source. When the ratio of the number of pixels having the pixel value greater than 239 does not exceed 5%, it is indicated that the region is not the target region having the light source.

Figure 8:
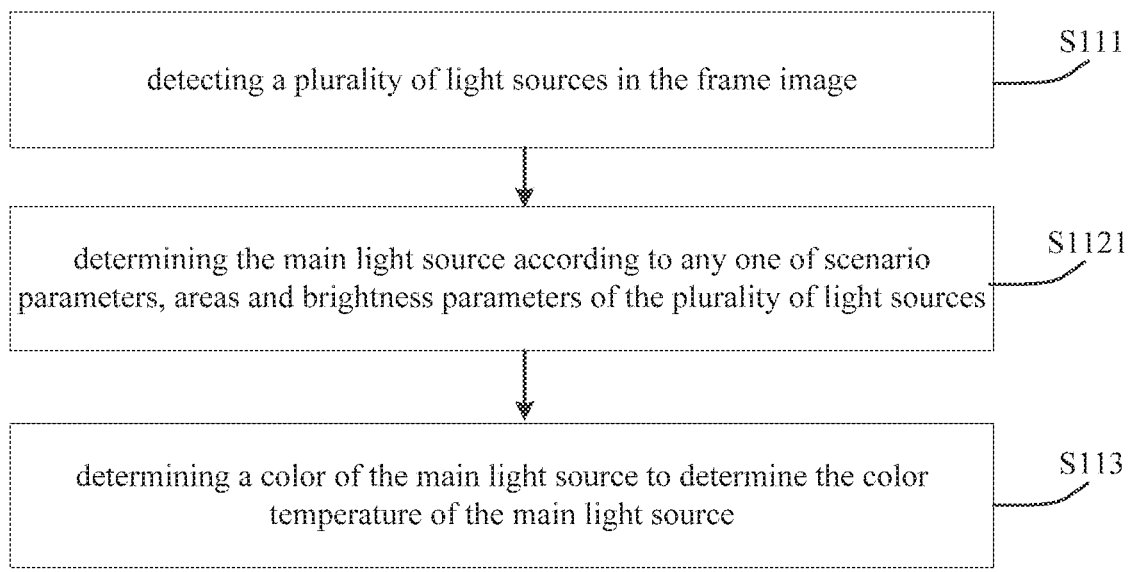
FIG. 8 is a flow chart illustrating a white balance processing method according to an implementation of the present disclosure.

Referring to FIG. 8, in some implementations, the block S112 includes the following.

In block S1121, the main light source is determined according to at least one of scenario parameters, areas and brightness parameters of the plurality of light sources. The scenario parameters include time for capturing the image and signal intensity of GPS. The brightness parameters include brightness of the plurality of light sources and average brightness of the image.

Specifically, a time period when a present time is within may be determined according to the time for capturing the image. A location where the user captures the image within a present time period may be determined according to a timetable and routine of the user stored locally. For example, at 12:00 a.m., the user generally has lunch at restaurant. After 8:00 p.m., the user generally reads books in living room. Therefore, it may be determined roughly whether the user is in an indoor environment, in an outdoor environment or in a certain scenario according to the time for capturing the image. In addition, the signal intensity of GPS in the outdoor environment is generally greater than the signal intensity of GPS in the indoor environment. Therefore, it may be determined roughly whether the user is in the indoor environment or in the outdoor environment according to the signal intensity of GPS. It may be understood that, the color temperature of an indoor light source is generally lower than 5000K. For example, the color temperature of a tungsten lamp ranges from 2760 to 2900K, and the color temperature of a flash light is 3800K. The color temperature of an outdoor light source may be higher than 5000K. For example, the color temperature of the sun at noon is 5000K, and the color temperature of the sky at noon is 10000K. Therefore, according to the indoor environment or the outdoor environment where the user is, whether the present color temperature is lower than 5000K or higher than 5000K may be roughly determined. Therefore, the main light source may be determined.

When the main light source is determined according to the areas of the plurality of light sources, the areas of the plurality of light sources may be compared with each other to select a light source having a largest area as the main light source. For example, as illustrated in FIG. 6, the area of the light source R is greater than the area of the light source and is greater than the area of the light source B. The light source R is thus determined as the main light source.

When the main light source is determined according to brightness of the plurality of light sources and the average brightness of the image, the main light source may be determined by comparing the brightness of the plurality of light sources with each other in combination with the average brightness of the image. It may be understood that, the higher the brightness of the light source, the higher the overall influence on the image is. When the brightness of a certain light source is high and is matched to the average brightness of the image, the certain light source is determined as the main light source.

With the white balance processing method according to the implementation of the present disclosure, the main light source may be determined according to a combination of the time for capturing the image under the plurality of light sources and the signal intensity of GPS. Alternatively, the main light source may be determined according to the areas of the plurality of light sources. Alternatively, the main light source may be determined according to a combination of the brightness of the plurality of light sources and the average brightness of the image. Alternatively, the main light source may be determined according to a combination of the time for capturing the image under the plurality of light sources and the signal intensity of GPS, as well as the areas of the plurality of light sources. Alternatively, the main light source may be determined according to a combination of the time for capturing the image under the plurality of light sources and the signal intensity of GPS, and a combination of the brightness of the plurality of light sources and the average brightness of the image. Alternatively, the main light source may be determined according to the areas of the plurality of light sources, and a combination of the brightness of the plurality of light sources and the average brightness of the image. Alternatively, the main light source may be determined according to a combination of the time for capturing the image under the plurality of light sources and the signal intensity of GPS, the areas and a combination of the brightness and the average brightness of the image.

In an embodiment, the main light source is determined according to a combination of the time for capturing the image under the plurality of light sources and the signal intensity of GPS, the areas and the combination of the brightness and the average brightness of the image, with the white balance processing method. The combination of the time for capturing the image under the plurality of light sources and the signal intensity of GPS, the areas and the combination of the brightness and the average brightness of the image may be set with different weights. Therefore, the main light source may be accurately selected to perform the white balance process on the image, thereby better satisfying the white balance effect desired by the user.

Figure 9:
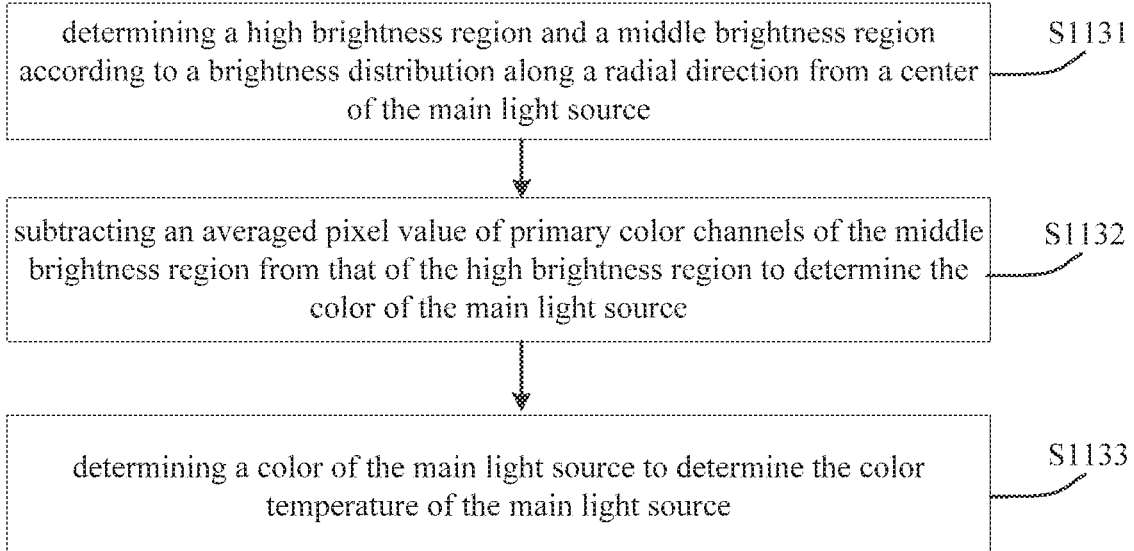
FIG. 9 is a flow chart illustrating a white balance processing method according to an implementation of the present disclosure.

Referring to FIG. 9, in some implementations, the block S113 includes the following.

In block S1131, a high brightness region and a middle brightness region are determined according to a brightness distribution along a radial direction from a center of the main light source.

In block S1132, an averaged pixel value of primary color channels of the middle brightness region is subtracted from an averaged pixel value of primary color channels of the high brightness region to determine the color of the main light source.

In block S1133, the color temperature of the main light source is determined according to the color of the main light source.

Figure 10:
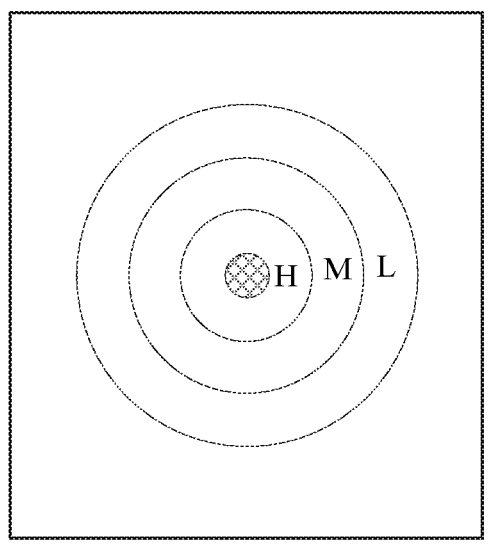
FIG. 10 is a schematic diagram illustrating a scenario of a white balance processing method according to an implementation of the present disclosure.

Specifically, referring to FIG. 10, a position of the main light source in the image is determined. A shadowed region illustrated at center of FIG. 10 is an over-exposed region, which is generally a big white spot and excludes any information of the color of the light source. The high brightness region H, the middle brightness region M and the low brightness region L are distributed along the radial direction from the center of the main light source. The high brightness region H may refer to a region defined by pixels having brightness within a first brightness range L1 along the radial direction from the center of the main light source. The first brightness range L1 is for example [200, 239). The middle brightness region M may refer to a region defined by pixels having brightness within a second brightness range L2 along the radial direction from the center of the main light source. The second brightness range L2 is for example [150, 200). It is to be noted that, the first brightness range L1 and the second brightness range L2 may be determined according to the brightness distribution along the radial direction from the center of main light source. For example, when the brightness of the light source is attenuated rapidly, the first brightness range L1 and the second brightness range L2 may be suitably increased. For example, when the brightness of the light source is attenuated slowly, the first brightness range L1 and the second brightness range L2 may be suitably decreased.

The averaged pixel value of the primary color channels of the high brightness region is an average of pixel values of all pixels in the high brightness region. The averaged pixel value of the primary color channels of the middle brightness region is the average of the pixel values of all pixels in the middle brightness region. It is assumed that the number of pixels in the high brightness region is C1, and the number of pixels in the middle brightness region is C2, the averaged pixel value of the primary color channels of the high brightness region is denoted as:

$$\overline{H} = \frac{\left(\sum_{1}^{C1} R, \sum_{1}^{C1} G, \sum_{1}^{C1} B\right)}{C1}$$

and the averaged pixel value of the primary color channels of the middle brightness region is denoted as:

$$\overline{M} = \frac{\left(\sum_{1}^{C2} R, \sum_{1}^{C2} G, \sum_{1}^{C2} B\right)}{C2}$$

Figure 11:
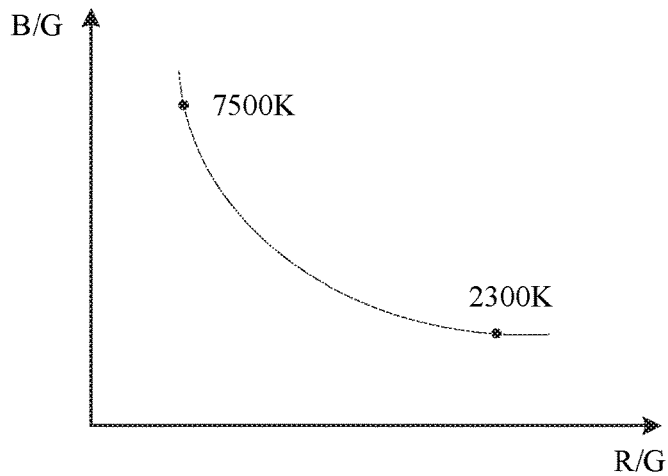
FIG. 11 is a curve plot of color temperature described in a white balance processing method according to an implementation of the present disclosure.

The averaged pixel value $\overline{M}$ of the primary color channels of the middle brightness region is subtracted from the averaged pixel value $\overline{H}$ of the primary color channels of the high brightness region (that is $\overline{H}-\overline{M}$) to determine the color of the main light source. The color temperature of the main light source may be accordingly determined according to the color of the main light source. Specifically, referring to FIG. 11, in an embodiment, under standard light boxes having the color temperature of 3000K, 4000K, 5000K, 6000K . . . , images are acquired and corresponding vales of $\overline{H}-\overline{M}$ under the color temperature are calculated. Therefore, a curve plot (as illustrated in FIG. 11) or a mapping table representing a relationship between the values of $\overline{H}-\overline{M}$ and the color temperature of the light sources may be determined. The curve plot and the mapping table may be stored in a local database. In an implementation of the present disclosure, after the value of $\overline{H}-\overline{M}$ is calculated, the color temperature of the main light source may be inquired based on the curved plot and the mapping table. White balance parameters may be searched for according to the color temperature of the main light source and a correspondence between the color temperature of the main light source and white balance parameters. Therefore, a white balance process may be performed on the image according to the white balance parameters.

Figure 12:
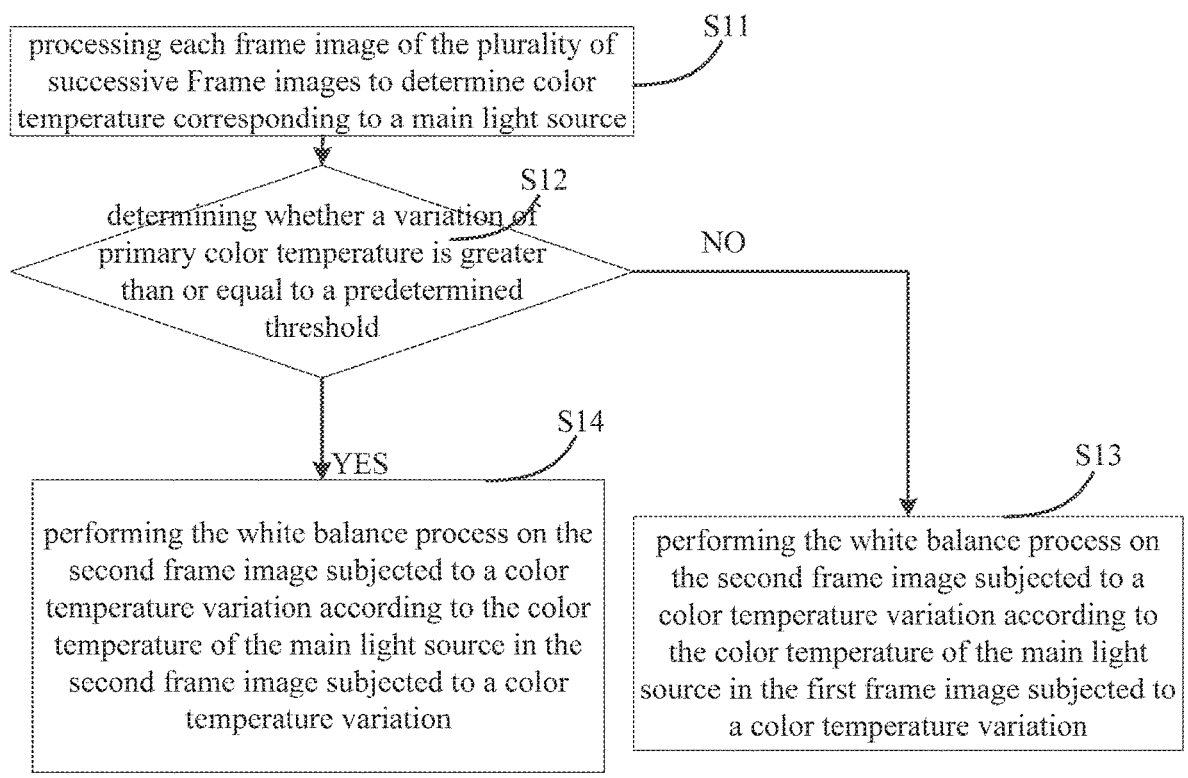
FIG. 12 is a flow chart illustrating a white balance processing method according to an implementation of the present disclosure.

Referring to FIG. 12, in some implementations, the white balance processing method further includes the following.

In block S14, when the variation of the primary color temperature is greater than or equal to the predetermined threshold, the white balance process is performed on the second frame image subjected to the color temperature variation according to the color temperature of the main light source in the second frame image subjected to the color temperature variation.

With the white balance processing method according to an implementation of the present disclosure, the white balance process may be performed on the present frame image according to the color temperature of the main light source in the present frame image when the color temperature of the main light source is largely varied due to a serious shaking of the camera (that is, the variation of the primary color temperature of the main light source between the present frame image and an adjacent previous frame image is greater than or equal to the predetermined threshold).

Specifically, referring to FIG. 2, in an embodiment, when the camera is shaken (for example shaken up and down), a plurality of frame images are successively presented in the field of view of the camera, including F0, F1, F2, F3 . . . . It is assumed that F0 is the first frame image subjected to the color temperature variation, F1 is the second frame image subjected to the color temperature variation, F2 is the third frame image subjected to the color temperature variation, and F3 is the fourth frame image subjected to the color temperature variation. In the image F0, the light source R is the main light source, and the color temperature of the light source R is CCT0. The white balance process is performed on the image F0 according to the color temperature CCT0 of the light source R with the white balance processing method. In the image F1, the light source R is partially moved out of the field of view, the light source B is the main light source and the color temperature of the light source B is CCT1. It is determined whether an absolute value |CCT1−CCT0| of a difference between CCT1 and CCT0 (the variation ΔT of the primary color temperature) is greater than or equal to the predetermined threshold T0 (the predetermined threshold T0 may be 50K, 100K, 120K, which is not limited herein) by the white balance processing method. When ΔT≥T0, the white balance process is performed on the image F1 according to the color temperature CCT1 of the light source B. Therefore, when the variation ΔT of the primary color temperature is relatively large, it may be determined that the camera is moved normally. Therefore, the main light source may be switched among the plurality of light sources in real time.

Figure 13:
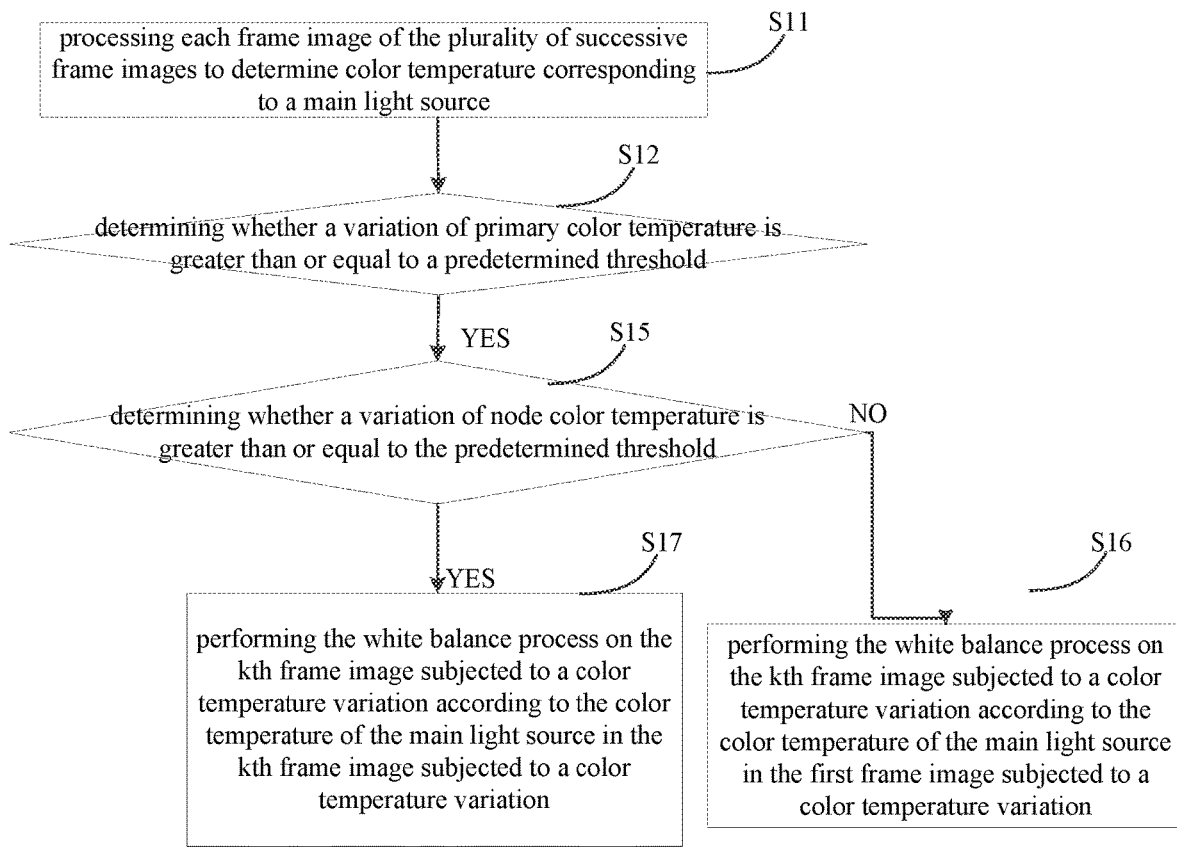
FIG. 13 is a flow chart illustrating a white balance processing method according to an implementation of the present disclosure.

Referring to FIG. 13, in some implementations, the white balance processing method further includes the following.

In block S15, it is determined whether a variation of node color temperature is greater than or equal to the predetermined threshold when the variation of the primary color temperature is greater than or equal to the predetermined threshold. The variation of node color temperature refers to a difference between the color temperature of the main light source in a $k^{th}$ frame image subjected to the color temperature variation and that in the first frame image subjected to the color temperature variation.

In block S16, when the variation of the node color temperature is less than the predetermined threshold, the white balance process is performed on the $k^{th}$ frame image subjected to the color temperature variation according to the color temperature of the main light source in the first frame image subjected to the color temperature variation.

In block S17, when the variation of the node color temperature is greater than or equal to the predetermined threshold, the white balance process is performed on the $k^{th}$ frame image subjected to the color temperature variation according to the color temperature of the main light source in the $k^{th}$ frame image subjected to the color temperature variation.

With the white balance processing method according to an implementation of the present disclosure, it is further judged whether the variation of the node color temperature of the main light source between a subsequent frame image to the present frame image and an adjacent previous frame image to the present frame image is greater than or equal to the predetermined threshold when the color temperature of the main light source is largely varied due to a serious shaking of the camera (that is the variation of the primary color temperature of the main light source in the present frame image and in the adjacent previous frame image is greater than or equal to the predetermined threshold). When the variation of the node color temperature between the subsequent frame image and the adjacent previous frame image is less than the predetermined threshold, the white balance process is performed on the subsequent frame image according to the color temperature of main light source in the adjacent previous frame image. When the variation of node color temperature between the subsequent image and the adjacent previous image is greater than or equal to the predetermined threshold, the white balance process is performed on the subsequent frame image according to the color temperature of the main light source in the subsequent frame image.

Specifically, referring to FIG. 2 again, in an embodiment, when the camera is shaken (such as shaken up and down), a plurality of frame images are presented in the field of view of the camera in turn, including F0, F1, F2, F3 . . . . It is assumed that F0 is the first frame image subjected to the color temperature variation, F1 is the second frame image subjected to the color temperature variation, F2 is the third frame image subjected to the color temperature variation and F3 is the fourth frame image subjected to the color temperature variation. In the image F0, the light source R is the main light source, and the color temperature of the light source R is CCT0. The white balance process is performed on the image F0 according to the color temperature of the light source R with the white balance processing method. In the image F1, the light source R is partially moved out of the field of view, the light source B is the main light source, and the color temperature of the light source B is CCT1. In the image F2, the light source R is completely moved out of the field of view, the light source B is the main light source, and the color temperature of the light source B is CCT2. In the image F3, the light source R is moved back to the field of view, the light source R is the main light source and the color temperature of the light source R is CCT3. In embodiments, taking k=3 as an example for illustrating the workflow of the white balance processing method. It is determined whether the absolute value |CCT1−CCT0| of a difference between CCT1 and CCT0 (i.e., the variation ΔT of the primary color temperature) is greater than or equal to the predetermined threshold T0 (the predetermined threshold T0 may be 50K, 100K, 120K, which is not limited herein) with the white balance processing method. When ΔT≥T0, it is determined whether the absolute value |CCT3−CCT0| of the difference between CCT3 and CCT0 (i.e., the variation ΔT1 of the node color temperature) is greater than or equal to the predetermined threshold T0. When ΔT1<T0, the white balance process is performed on the image F3 according to the color temperature CCT0 of the light source R. When ΔT1≥T0, the white balance process is performed on the image F3 according to the color temperature CCT3 of the light source R.

Therefore, within a short time period, the main light source is switch from the light source R to the light source B and switched from the light source B to the light source R due to the shaking of the camera. The white balance process performed on an intermediate frame image according to the color temperature of the light source B may be omitted. That is, the white balance processing method according to an implementation of the present disclosure does not perform the white balance process on the image until the frequent switch of the main light source is over to prevent a variation of a tone of a preview image after the white balance correction due to the frequent switch of the main light source.

Figure 14:
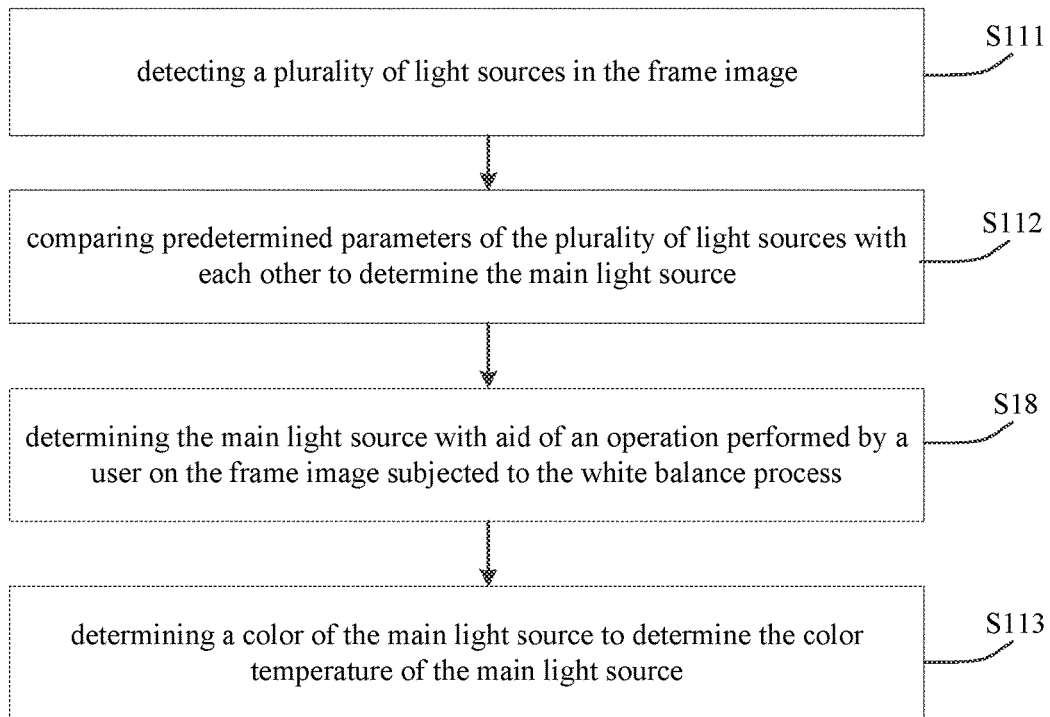
FIG. 14 is a flow chart illustrating a white balance processing method according to an implementation of the present disclosure.

Referring to FIG. 14, in some implementations, the white balance processing method further includes the following.

In block S18, the main light source is determined with aid of an operation performed by a user on the frame image subjected to the white balance process.

With the white balance processing method according to an implementation of the present disclosure, the main light source may be determined with the aid of the operation performed usually by the user on the image subjected to the white balance process while determining the main light source by comparing the predetermined parameters of the plurality of light sources with each other. The operation may include at least one of edition, storing and deletion.

Specifically, the image subjected to the white balance process may be an image stored in a local album after the white balance process. It may be understood that, the user may store an image with a good white balance effect and delete an image with a poor white balance effect. In addition, the user may edit the image, for example adjusting the color temperature of the image. Therefore, with a long-term machine learning and feedback, the main light source may be determined more and more accurately by the white balance processing method, and the white balance effect of performing the white balance process on the image may be more and more satisfied.

Figure 15:
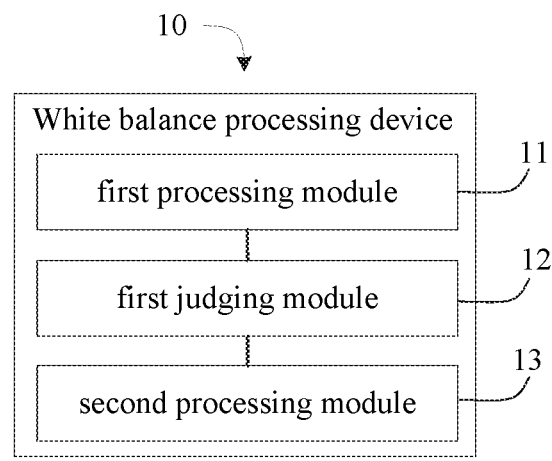
FIG. 15 is a block diagram illustrating a white balance processing device according to an implementation of the present disclosure.

Referring to FIG. 15, a white balance processing device 10 according to an implementation of the present disclosure is configured to perform a white balance process on a plurality of successive frame images under a scenario with multiple light sources. The white balance processing device 10 includes a first processing module 11, a first judging module 12 and a second processing module 13. The white balance processing method according to an implementation of the present disclosure may be realized by the white balance processing device 10 according to an implementation of the present disclosure. For example, the block S11 may be realized by the first processing module 11. The block S12 may be realized by the first judging module 12. The block S13 may be realized by the second processing module 13.

That is to say, the first processing module 11 may be configured to process each frame image of a plurality of successive frame images to determine color temperature corresponding to a main light source. The first judging module 12 may be configured to judge whether a variation of primary color temperature is greater than or equal to a predetermine threshold. The variation of the primary color temperature refers to a difference between the color temperature of the main light source in a second frame image subjected to a color temperature variation and the color temperature of the main light source in a first frame image subjected to the color temperature variation. The second processing module 13 may be configured to, when the variation of the primary color temperature is less than the predetermined threshold, perform a white balance process on the second frame image subjected to the color temperature variation according to the color temperature of the main light source in the first frame image subjected to the color temperature variation.

With the white balance processing device 10 according to implementations of the present disclosure, when the variation of the primary color temperature of the main light source in two adjacent frame images is less than the predetermined threshold, the white balance process is performed on a present frame image using the color temperature of the main light source in an adjacent previous frame image. Therefore, a frequent switch of the main light source caused by a shaking of the field of view may be prevented when the camera is shaken, and the variation of a tone of a preview image having white balance corrected is further prevented, thereby improving user experience.

Figure 16:
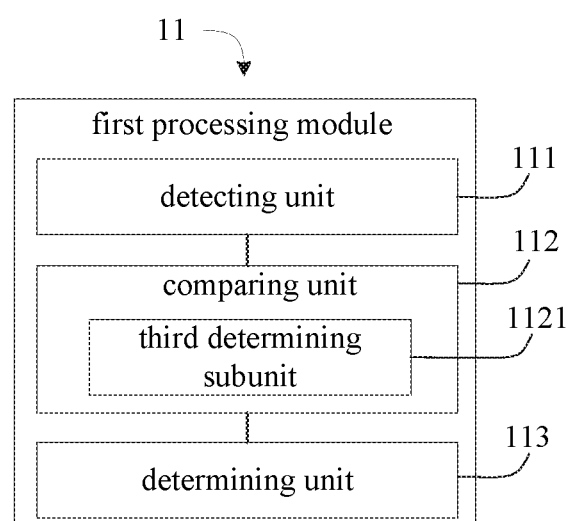
FIG. 16 is a block diagram illustrating a first processing module according to an implementation of the present disclosure.

Referring to FIG. 16, in some implementations, the first processing module 11 includes a detecting unit 111, a comparing unit 112 and a determining unit 113. The block S111 may be realized by the detecting unit 111. The block S112 may be realized by the comparing unit 112. The block S113 may be realized by the determining unit 113.

That is to say, the detecting unit 111 may be configured to detect a plurality of light sources in the image. The comparing unit 112 may be configured to compare predetermined parameters of the plurality of light sources with each other to determine the main light source. The determining unit 113 may be configured to determine a color of the main light source to determine the color temperature of the main light source.

Figure 17:
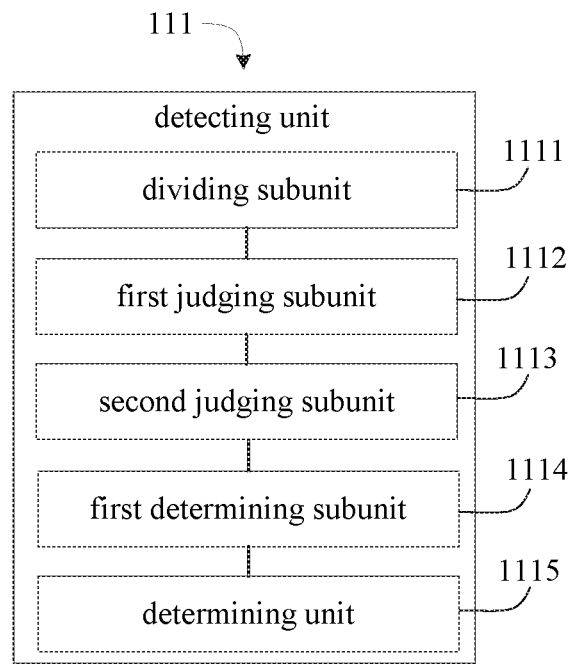
FIG. 17 is a block diagram illustrating a detecting module according to an implementation of the present disclosure.

Referring to FIG. 17, in some implementations, the detecting unit 111 includes a dividing subunit 1111, a first judging subunit 1112, a second judging subunit 1113, a first determining subunit 1114 and a second determining subunit 1115. The block S1111 may be realized by the dividing subunit 1111. The block S1112 may be realized by the first judging subunit 1112. The block S1113 may be realized by the second judging subunit 1113. The block S1114 may be realized by the first determining subunit 1114. The block S1115 may be realized by the second determining subunit 1115.

That is to say, the dividing subunit 1111 may be configured to divide the frame image into a plurality of regions. The first judging subunit 1112 may be configured to, according to a histogram of each region, determine whether the region is a target region having the light source. The second judging subunit 1113 may be configured to determine whether at least two target regions adjacent to each other exist when the region is the target region having the light source. The first determining subunit 1114 may be configured to stitch at least two light sources included in the at least two target regions into one of the plurality of light sources when the at least two target regions exist. The second determining subunit 1115 may be configured to determine the light source included in the target region as one of the plurality of light sources when the at least two target regions do not exist.

Referring to FIG. 16, in some implementations, the comparing unit 112 includes a third determining subunit 1121. The block S1121 may be realized by the third determining subunit 1121.

That is to say, the third determining subunit 1121 may be configured to determine the main light source according to at least one of scenario parameters, areas and brightness parameters of the plurality of light sources. The scenario parameters include time for capturing the image and signal intensity of the GPS. The brightness parameters include brightness of the plurality of light sources and average brightness of the image.

Figure 18:
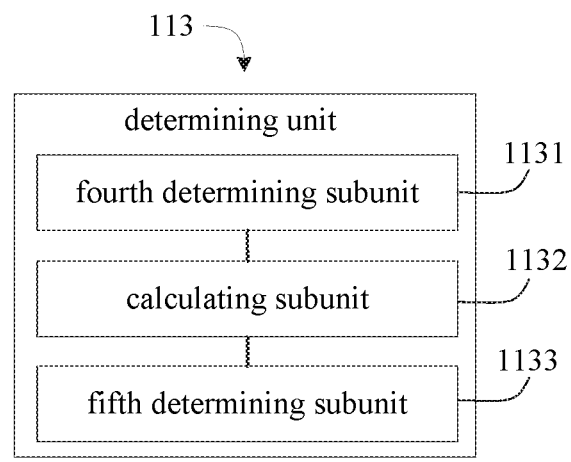
FIG. 18 is a block diagram illustrating a determining module according to an implementation of the present disclosure.

Referring to FIG. 18, in some implementations, the determining unit 113 includes a fourth determining subunit 1131, a comparing subunit 1132 and a fifth determining subunit 1133. The block S1131 may be realized by the fourth determining subunit 1131. The block S1132 may be realized by the calculating subunit 1132. The block S1133 may be realized by the fifth determining subunit 1133.

That is to say, the fourth determining subunit 1131 may be configured to determine a high brightness region and a middle brightness region according to a brightness distribution along a radial direction from a center of the main light source. The calculating subunit 1132 may be configured to subtract an averaged pixel value of primary color channels of the middle brightness region from an averaged pixel value of primary color channels of the high brightness region to determine the color of the main light source. The fifth determining subunit 1133 may be configured to determine the color temperature of the main light source according to the color of the main light source.

Figure 19:
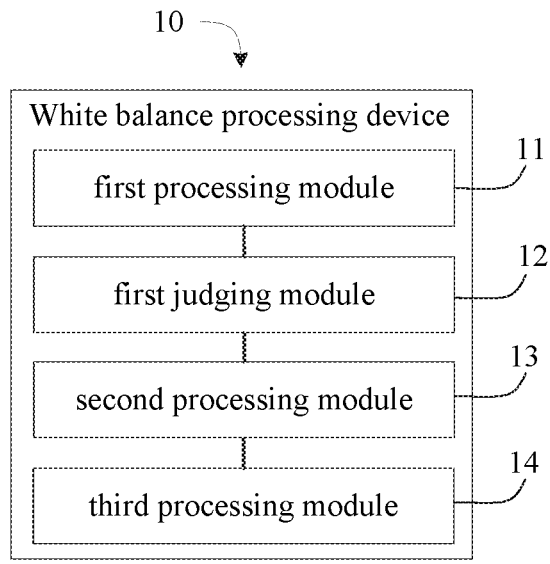
FIG. 19 is a block diagram illustrating a white balance processing device according to an implementation of the present disclosure.

Referring to FIG. 19, in some implementations, the white balance processing device 10 further includes a third processing module 14. The block S14 may be realized by the third processing module 14.

That is to say, the third processing module 14 may be configured to perform a white balance process on the second frame image subjected to the color temperature variation according to the color temperature of the main light source in the second frame image subjected to the color temperature variation when the variation of the primary color temperature is greater than or equal to the predetermined threshold.

Figure 20:
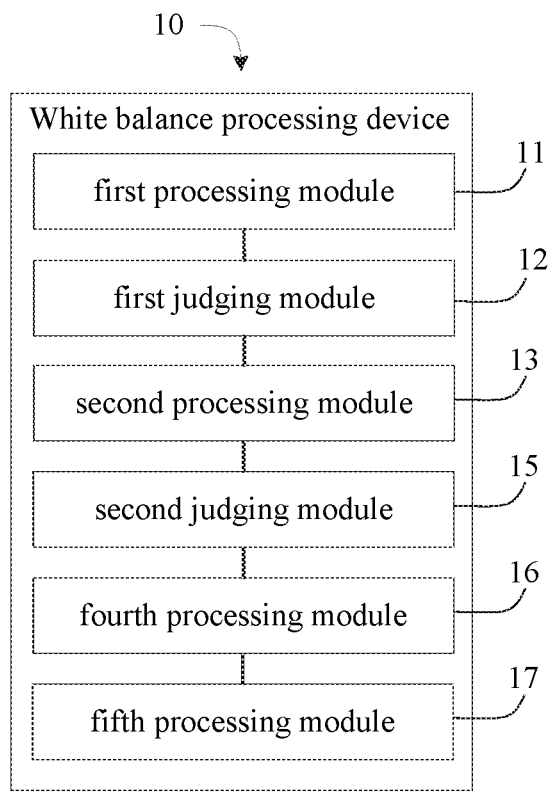
FIG. 20 is a block diagram illustrating a white balance processing device according to an implementation of the present disclosure.

Referring to FIG. 20, in some implementations, the white balance processing device 10 further includes a second judging module 15, a fourth processing module 16 and a fifth processing module 17. The block S15 may be realized by the second judging module 15. The block S16 may be realized by the fourth processing module 16. The block S17 may be realized by the fifth processing module 17.

Referring to FIG. 20 again, in other words, the second judging module 15 may be configured to judge whether a variation of node color temperature is greater than or equal to the predetermined threshold when the variation of the primary color temperature is greater than or equal to the predetermined threshold. The variation of the node color temperature refers to a difference between the color temperature of the main light source in a $k^{th}$ frame image subjected to the color temperature variation and that in the first frame image subjected to the color temperature variation. The fourth processing module 16 may be configured to perform a white balance process on the $k^{th}$ frame image subjected to the color temperature variation according to the color temperature of the main light source in the first frame image subjected to the color temperature variation. The fifth processing module 17 is configured to perform a white balance process on the $k^{th}$ frame image subjected to the color temperature variation according to the color temperature of the main light source in the $k^{th}$ frame image subjected to the color temperature variation.

Figure 21:
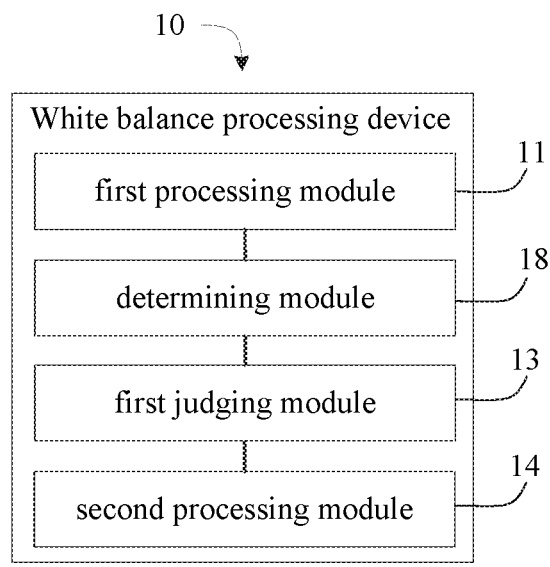
FIG. 21 is a block diagram illustrating a white balance processing device according to an implementation of the present disclosure.

Referring to FIG. 21, in some implementations, the white balance processing device 10 further includes a determining module 18. The block S18 may be realized by the determining module 18.

That is to say, the determining module 18 may be configured to determine the main light source with aid of an operation performed by a user on the frame image subjected to the white balance process.

Figure 22:
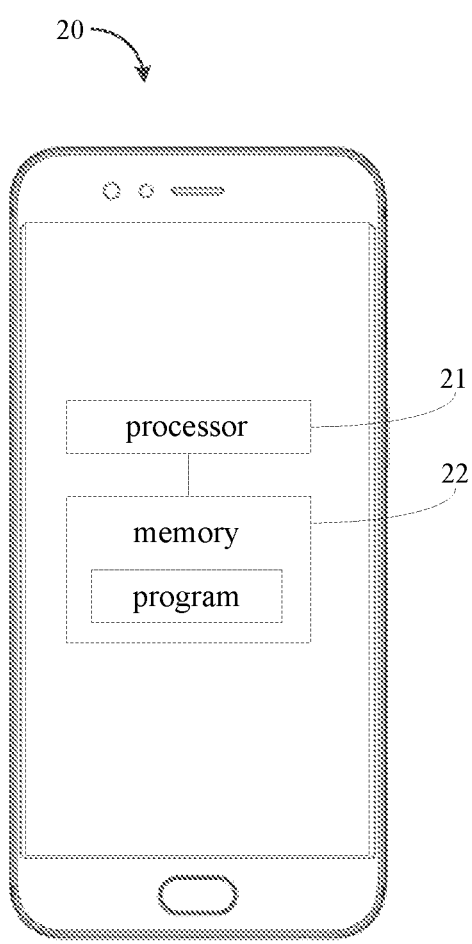
FIG. 22 is a block diagram illustrating an electronic device according to an implementation of the present disclosure.

Referring to FIG. 22, an electronic device 20 according to an implementation of the present disclosure includes one or more processors 21, a memory 22 and one or more programs. The one or more programs are stored in the memory 22 and are configured to be executable by the one or more processors 21. The programs include instructions for executing the white balance processing method according to any one of the above implementations.

For example, the programs include instructions for executing the white balance processing method including the following.

In block S11, each frame image of the plurality of the successive frame images is processed to determine color temperature corresponding to a main light source.

In block S12, it is judged whether a variation of primary color temperature is greater than or equal to a predetermined threshold. The variation of the primary color temperature refers to a difference between the color temperature of the main light source in a second frame image subjected to a color temperature variation and the color temperature of the main light source in a first frame image subjected to the color temperature variation.

In block S13, when the variation of the primary color temperature is less than the predetermined threshold, the white balance process is performed on the second frame image subjected to the color temperature variation according to the color temperature of the main light source in the first frame image subjected to the color temperature variation.

With the electronic device 20 according to an implementation of the present disclosure, the white balance process is performed on a present frame image according to the color temperature of the main light source in an adjacent previous frame image to the present frame image when the variation of the primary color temperature of the main light source in two adjacent frame images is less than the predetermined threshold. Therefore, a frequent switch of the main light source caused by a jump of the field of view may be prevented when the camera is shaken, and the variation of the tone of the preview image having the white balance corrected is further prevented, thereby improving user experience.

The electronic device 20 according to an implementation of the present disclosure includes, but is not limited to, a phone, a tablet computer, a laptop computer, a camera and other electronic devices having a photographing function.

Figure 23:
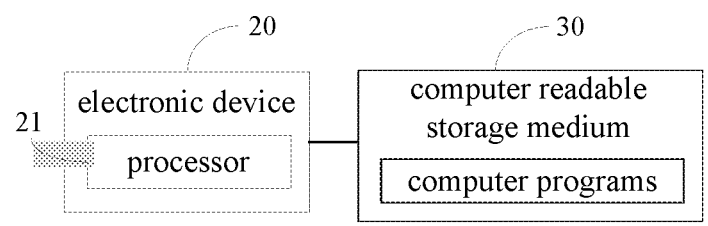
FIG. 23 is a schematic diagram illustrating a connection between an electronic device and a computer readable storage medium according to an implementation of the present disclosure.

Referring to FIG. 23, a computer readable storage medium 30 according to an implementation of the present disclosure includes computer programs cooperating with the electronic device 20. The computer programs may be executed by a processor 21 to realize the white balance processing method according to any one of the above implementations.

For example, the computer programs may be executed by the processor 21 to realize the white balance processing method including the following.

In block S11, each frame image of the plurality of the successive frame images is processed to determine color temperature corresponding to a main light source.

In block S12, it is judged whether a variation of primary color temperature is greater than or equal to a predetermined threshold. The variation of the primary color temperature refers to a difference between the color temperature of the main light source in a second frame image subjected to a color temperature variation and the color temperature of the main light source in a first frame image subjected to the color temperature variation.

In block S13, when the variation of the primary color temperature is less than the predetermined threshold, the white balance process is performed on the second frame image subjected to the color temperature variation according to the color temperature of the main light source in the first frame image subjected to the color temperature variation.

With the computer readable storage medium 30 according to an implementation of the present disclosure, the white balance process is performed on a present frame image according to the color temperature of the main light source in an adjacent previous frame image to the present frame image when the variation of the primary color temperature of the main light source in two adjacent frame images is less than the predetermined threshold. Therefore, a frequent switch of the main light source caused by a jump of the field of view may be prevented when the camera is shaken, and the variation of the tone of the preview image having the white balance corrected is further prevented, thereby improving user experience.

In the description of the present disclosure, reference throughout this specification to "an embodiment", "some embodiments", "a schematic example", "an example", "a specific example" or "some examples" means that a particular feature, structure, material, or characteristic described in connection with the implementation or example is included in at least one implementation or example of the present disclosure. In the specification, schematic expressions of the above terms are not necessarily referring to the same embodiment or example of the present disclosure. Furthermore, the particular features, structures, materials, or characteristics may be combined in any suitable manner in one or more implementations or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution may be different from that which is depicted or discussed, including executing functions in a substantially simultaneous manner or in an opposite order according to the related functions, which should be understood by those skilled in the art of the embodiments of the present disclosure.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to (a non-exhaustive list): an electronic connection (IPM overcurrent protection circuit) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the implementations of the present disclosure may be realized by the hardware, software, firmware or their combination. In the above implementations, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks or CD, etc.

Although explanatory embodiments have been shown and described, it would be appreciated by those skilled in the art that the above embodiments are exemplary and cannot be construed to limit the present disclosure, and changes, modifications, alternatives, and variations can be made in the embodiments within the scope of the present disclosure.

What is claimed is:

1. A white balance processing method, used to perform a white balance process on a plurality of successive frame images each subjected to a color temperature variation under a scenario with multiple light sources, comprising:
processing each frame image of the plurality of successive frame images to determine color temperature corresponding to a main light source, comprising:
dividing the frame image into a plurality of regions; according to a histogram of each region, determining whether the region is a target region having the light source; when the region is the target region having the light source, determining whether at least two target regions adjacent to each other exist; when the at least two target regions adjacent to each other exist, stitching at least two light sources included in the at least two target regions into one of the plurality of light sources; and when the at least two target regions adjacent to each other do not exist, determining the light source included in the target region as one of the plurality of light sources;

comparing predetermined parameters of the plurality of light sources with each other to determine the main light source; and determining a color of the main light source to determine the color temperature of the main light source;

determining whether a variation of primary color temperature is greater than or equal to a predetermined threshold, the variation of primary color temperature referring to a difference between the color temperature of the main light source in a second frame image and the color temperature of the main light source in a first frame image, wherein the first frame image and the second frame image are two frame images adjacent to each other from the plurality of successive frame images; and performing the white balance process on the second frame image according to the color temperature of the main light source in the first frame image when the variation of primary color temperature is less than the predetermined threshold.

2. The method according to claim 1, wherein the histogram is selected from a group comprising:

a histogram showing a pixel value on a horizontal axis and a number of pixels on a longitudinal axis;

a histogram showing a number of pixels on a horizontal axis and a pixel value on a longitudinal axis;

a histogram showing a ratio of a number of pixels on a horizontal axis and a pixel value on a longitudinal axis; and a histogram showing a pixel value on a horizontal axis and a ratio of a number of pixels on a longitudinal axis.

3. The method according to claim 1, wherein determining whether the region is the target region having the light source according to the histogram of the region comprises:

determining whether a ratio of a number of pixels each with a pixel value greater than a predetermined value exceeds a predetermined ratio;

when the ratio of the number of pixels each with the pixel value greater than the predetermined value exceeds the predetermined ratio, determining that the region is the target region having the light source according to the histogram of the region; and when the ratio of the number of pixels each with the pixel value greater than the predetermined value does not exceed the predetermined ratio, determining that the region is not the target region having the light source according to the histogram of the region.

4. The method according to claim 1, wherein comparing the predetermined parameters of the plurality of light sources to determine the main light source comprises:

determining the main light source according to any one of scenario parameters, areas and brightness parameters of the plurality of light sources, the scenario parameters comprising time for capturing the image and signal intensity of GPS, the brightness parameters comprising brightness of the plurality of light sources and average brightness of the image.

5. The method according to claim 4, wherein determining the main light source according to the areas of the plurality of light sources comprises:

determining a light source having a maximum area as the main light source.

6. The method according to claim 4, wherein determining the main light source according to the brightness of the plurality of light sources and average brightness of the image comprises:

determining a light source with brightness greater than a predetermined brightness and matched with the average brightness of the image as the main light source.

7. The method according to claim 1, wherein determining the color of the main light source to determine the color temperature of the main light source comprises:

determining a first region and a second region according to a brightness distribution along a radial direction from a center of the main light source, wherein the first region refers to a region defined by pixels having brightness within a first brightness range along the radial direction from the center of the main light source, the second region refers to a region defined by pixels having brightness within a second brightness range along the radial direction from the center of the main light source, an upper limit of the second brightness range is less than or equal to a lower limit of the first brightness range;

subtracting an averaged pixel value of primary color channels of the second region from an averaged pixel value of primary color channels of the first region to determine the color of the main light source; and determining the color temperature of the main light source according to the color of the main light source.

8. The method according to claim 1, further comprising:

when the variation of the primary color temperature is greater than or equal to the predetermined threshold, performing the white balance process on the second frame image according to the color temperature of the main light source in the second frame image.

9. The method according to claim 1, further comprising:

when the variation of the primary color temperature is greater than or equal to the predetermined threshold, determining whether a variation of node color temperature is greater than or equal to the predetermined threshold, the variation of the node color temperature referring to a difference between the color temperature of the main light source in a third frame image and the color temperature of the main light source in the first frame image, wherein the third frame image is not adjacent to the first frame image and from the plurality of successive frame images;

when the variation of the node color temperature is less than the predetermined threshold, performing the white balance process on the third frame image according to the color temperature of the main light source in the first frame image; and when the variation of the node color temperature is greater than or equal to the predetermined threshold, performing the white balance process on the third frame image according to the color temperature of the main light source in the third frame image.

10. The method according to claim 1, further comprising:

determining the main light source with aid of an operation performed by a user on the frame image subjected to the white balance process.

11. The method according to claim 10, wherein the operation comprises at least one of edition, storing and deletion.

12. An electronic device, comprising:

one or more processors;

a memory; and one or more programs, stored in the memory and configured to be executable by the one or more processors;

wherein the one or more programs comprises instructions, when the instructions are executed, the one or more processors are configured to:

process each frame image of a plurality of successive frame images each subjected to a color temperature variation to determine color temperature corresponding to a main light source, by dividing the frame image into a plurality of regions; according to a histogram of each region, determining whether the region is a target region having the light source; when the region is the target region having the light source, determining whether at least two target regions adjacent to each other exist when the at least two target regions adjacent to each other exist, stitching at least two light sources included in the at least two target regions into one of the plurality of light sources; and when the at least two target regions adjacent to each other do not exist, determining the light source included in the target region as one of the plurality of light sources;

comparing predetermined parameters of the plurality of light sources with each other to determine the main light source; and determining a color of the main light source to determine the color temperature of the main light source;

determine whether a variation of primary color temperature is greater than or equal to a predetermined threshold, the variation of primary color temperature referring to a difference between the color temperature of the main light source in a second frame image and the color temperature of the main light source in a first frame image, wherein the first frame image and the second frame image are two frame images adjacent to each other and from the plurality of successive frame images; and perform the white balance process on the second frame image according to the color temperature of the main light source in the first frame image when the variation of primary color temperature is less than the predetermined threshold.

13. The electronic device according to claim 12, wherein the one or more processors are configured to compare the predetermined parameters of the plurality of light sources to determine the main light source by acts of:

determining the main light source according to any one of scenario parameters, areas and brightness parameters of the plurality of light sources, the scenario parameters comprising time for capturing the image and signal intensity of GPS, the brightness parameters comprising brightness of the plurality of light sources and average brightness of the image.

14. The electronic device according to claim 12, wherein the one or more processors are configured to determine the color of the main light source to determine the color temperature of the main light source by acts of:

determining a first region and a second region according to a brightness distribution along a radial direction from a center of the main light source, wherein the first region refers to a region defined by pixels having brightness within a first brightness range along the radial direction from the center of the main light source, the second region refers to a region defined by pixels having brightness within a second brightness range along the radial direction from the center of the main light source, an upper limit of the second brightness range is less than or equal to a lower limit of the first brightness range;

subtracting an averaged pixel value of primary color channels of the second region from an averaged pixel value of primary color channels of the first region to determine the color of the main light source; and determining the color temperature of the main light source according to the color of the main light source.

15. The electronic device according to claim 12, wherein the one or more processors are further configured to:

when the variation of the primary color temperature is greater than or equal to the predetermined threshold, perform the white balance process on the second frame image subjected to the color temperature variation according to the color temperature of the main light source in the second frame image subjected to the color temperature variation.

16. A non-transitory computer readable storage medium, comprising computer programs cooperating with the electronic device, wherein the computer programs are executed by a processor to execute a white balance processing method, the white balance processing method is used to perform a white balance process on a plurality of successive frame images each subjected to a color temperature variation under a scenario with multiple light sources and comprises:

processing each frame image of the plurality of successive frame images to determine color temperature corresponding to a main light source, comprising:

dividing the frame image into a plurality of regions; according to a histogram of each region, determining whether the region is a target region having the light source; when the region is the target region having the light source, determining whether at least two target regions adjacent to each other exist when the at least two target regions adjacent to each other exist, stitching at least two light sources included in the at least two target regions into one of the plurality of light sources; and when the at least two target regions adjacent to each other do not exist, determining the light source included in the target region as one of the plurality of light sources;

comparing predetermined parameters of the plurality of light sources with each other to determine the main light source; and determining a color of the main light source to determine the color temperature of the main light source;

determining whether a variation of primary color temperature is greater than or equal to a predetermined threshold, the variation of primary color temperature referring to a difference between the color temperature of the main light source in a second frame image and the color temperature of the main light source in a first frame image, wherein the first frame image and the second frame image are two frame images adjacent to each other from the plurality of successive frame images; and performing the white balance process on the second frame image according to the color temperature of the main light source in the first frame image when the variation of primary color temperature is less than the predetermined threshold.

* * * * *